3,337,497
ORDERED ORGANOPOLYSILOXANES
Edgar E. Bostick, Scotia, N.Y., assignor to General
Electric Company, a corporation of New York
No Drawing. Filed Apr. 11, 1966, Ser. No. 541,540
12 Claims. (Cl. 260—46.5)

The present invention relates to sequentially arranged block-block organopolysiloxane copolymers and methods for preparing the same. More particularly, the invention relates to sequentially arranged pre-ordained block copolymers in which at least 75% or more, and up to close to 100%, of the blocks in the polymer are of a preordained and regular nature and are derived in essentially the same order and in the same relative amount as the cyclic organotrisloxane employed for making the aforesaid polymer. The invention also encompasses a method for making the afroesaid block-block organopolysiloxanes by effecting reaction between (a) an organo-lithium compound containing at least one lithium atom (for example, from 1 to 4 or more lithium atoms) attached directly to a silicon atom in the organo-lithium compound through the medium of an oxygen atom and (b) a cyclic polysiloxane of the formula I
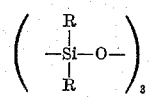

the said reaction preferably, although not necessarily, being carried out at temperatures below 100° C. in an aprotic solvent for at least one of the reactants, where R may be the same or different organic radicals and in addition to being free of aliphatic-substituted halogen, is a member selected from the class consisting of monovalent hydrocarbon radicals, cyanoalkyl radicals, and halogenated aryl radicals.

A class of organolithium compounds which I have found to be especially effective in preparing the blockblock organopolysiloxanes from the cyclic polysiloxanes of Formula I are organo-lithium compounds of the general formula II
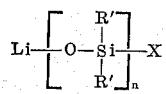

where R' may be the same or different monovalent organic radicals including but not limited to the same radicals recited for R above, X is a member selected from the class consisting of R, OH, —OR', —OLi, —OSiR'$_3$, AlH$_4$, and NR"$_2$, where R" is the same as R' and in addition may be hydrogen, and $n$ is a whole number equal to at least 1, for example, from 1 to 100 or more. By carrying out the above-described process, the siloxane units of the organo-lithium compound and of the cyclic polysiloxane of Formula I are both present in the ordered arrangement.

The term "aprotic solvent" is intended to mean any organic solvent which has no active protons which may interfere with growing anionic polymerization centers. As will be evident to those skilled in the art, any aprotic solvent which is capable of dissolving the polymeric mixture and causing intimate contact of an additional diorganocyclosiloxane with the polymerizing system may be used. These may include such solvents as benzene, toluene, xylene, mesitylene, etc. The use of solvents having different boiling points allows the practice of this invention at variable temperatures. However, it is preferred that certain special dipolar aprotic solvents having electron-donating centers be employed. These solvents are chosen such that their electron-donating centers are capable of forming coordinated complexes with the lithium cation, thereby increasing its reactivity towards diorganocyclosiloxane polymerization without the loss of specificity in ring opening reactions. Aprotic solvents which have Lewis base characteristics are preferably employed because of their ability to donate electrons to the lithium cation, thereby coordinating with the lithium and enhancing its reactivity by virtue of such coordination.

It is known in organosilicon art that cyclic diorganosiloxanes could be polymerized to high polymers by heating them with alkaline catalysts, such as potassium hydroxide or its corresponding siloxane salts. This has become the predominant method for the production of siloxane elastomers. However, during this alkaline polymerization, breaking of the siloxane ring to form high polymers and degradation of high polymers to form cyclics is occurring constantly, and since these polymerization and degradation reactions occur at different rates, the resulting product represents an equilibrium between the two processes. Because of these competing reactions, any polymer which is ultimately formed, if produced from a mixture of cyclic polysiloxanes, contains a random distribution of the segments derived from the different cyclic polysiloxanes involved. These polymers (which term is intended to include copolymers, terpolymers and more complex mixtures of siloxane units) although exhibiting useful properties, due primarily to their gross composition of matter, are highly random in nature. This randomness is often aggravated during copolymerization of two or more organocyclopolysiloxanes by the difference in reactivity of the cyclopolysiloxanes. In addition, it is often difficult to obtain polymerization without significant formation of cyclic polysiloxanes resulting in an undesirable contamination of the finally polymerized product.

Workers in the silicone art have made numerous attempts to reduce or eliminate this randomness in the hope of better controlling the polymerization and condensation reaction. One of the methods for synthesizing organosiloxane block polymers is based on the premise that the homopolymer segments must be prepared separately and then coupled by means of an appropriate condensation catalyst. For instance, in U.S. Patent 3,156,668, issued Nov. 10, 1964, hydroxy chain-stopped polydiorganosiloxanes of the formula III
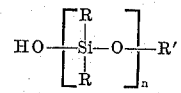

where R, R' and $n$ can have the meanings above, are heated in the presence of, for example, lithium hydroxide or a lithium silanolate as catalyst to effect condensation of the hydroxy groups and to lengthen the chain. Although this process is intended to minimize the formation of cyclic polysiloxanes, nevertheless, it is apparent that if two different hydroxy chain-stopped polydiorganopolysiloxanes are interacted by this method, the manner in which these polymers will intercondense will again be of a random nature by virtue of the inability to control the points at which each siloxane segment will attach to its neighboring siloxane segment, thus allowing intracondensation as well as intercondensation of siloxane segments. Furthermore, this again leads to the undesirable formation of cyclic polysiloxanes as contaminants and as a limiting factor on the optimum yield of linear polysiloxanes. As a further limitation on this process, the segments must be difunctional and of high purity in order to attain gel-free, high molecular weight, linear polymers. For the foregoing reasons, the ultimate structure and properties of such copolysiloxanes are still difficult to define and may vary widely with slight differences in segment length and reactivity, and preparative conditions.

I have now discovered a means for making block-block copolymers sequentially arranged in a preordained manner by employing the above-described organo-lithium compound with a cyclic organotrisiloxane using a particular class of solvents for the purpose. In addition to being able to prepare organopolysiloxanes having extremely narrow molecular weight distributions, it has also been possible to effect further polymerization without equilibration, i.e., without any siloxane rearrangement. Thus, once polymer chains are formed, because of their stability to the basic lithium ion, they do not undergo significant equilibration or rearrangement. In addition, by virtue of the high degree of order present in the polymers, the latter have new and unique properties of an unpredictable nature. By means of my process, one can perform custom synthesis of block copolymers, and the properties of the polymer can be varied by the choice of the organopolysiloxane, the segment length, the sequence of segments, and gross molecular weight.

In referring to the blocks comprising the polymers prepared in accordance with the practice of the present invention, it is intended that these blocks include not only single diorganosiloxy units

but also a plurality of diorganosiloxy units linked to each other directly through the oxygen atom. These preordained blocks of diorganosiloxy units also include from 1 to as many as a 1000 or more siloxy units derived from the lithium compound. Additionally, by sequentially adding various cyclotrisiloxanes, one can introduce blocks of diorganosiloxy units of many varieties thereby further modifying the properties of the ultimate products.

The fact that I have been able to produce the above-desired sequential block-block copolymers by means of the above-described process was entirely unexpected and in no way could have been predicted. In the first place, I have found that it is critical that one employ a lithium compound. When one employs, for example, other alkali-metal compounds in which the lithium atom (or atoms) of the organolithium compound is replaced by potassium, any reaction which occurs will lead to equilibrated and random products. Moreover, if an octaorganocyclotetrasiloxane, for example, octamethylcyclotetrasiloxane is employed initially with the organolithium compound in place of a hexaorganocyclotrisiloxane, e.g., hexamethylcyclotrisiloxane, again little if any reaction occurs under the prescribed conditions, especially at temperatures below 100° C. Finally, the use of solvents other than an aprotic solvent which does not donate electrons, for instance, hydrocarbon solvents, etc., at temperatures below 100° C. leads to very little polymerization and condensation with which the art is familiar as being the common result from the reaction of a cyclic organopolysiloxane with an alkali-metal compound. As the temperature of reaction rises above 100° C. to as high as 200° C., non-electron donating solvents can be used with similar effect of at least 75% regularity of siloxane blocks as that attained at lower temperatures with an electron-donating aprotic solvent.

It should be recognized that the method of growth of the block polymer can be unidirectional or can proceed in two or more directions depending on the number of lithium atoms in the lithium compound. For instance, if one were to react lithium trimethylsilanolate with hexamethylcyclotrisiloxane in the aprotic solvent, one would obtain the composition IV 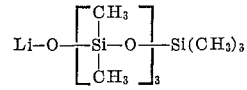

If one employs a molar ratio of one mole of lithium trimethylsilanolate per three moles of the hexamethylcyclotrisiloxane, one introduces nine additional dimethylsiloxy units into the lithium compound which would then have the formula V 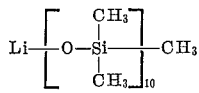

Thus, by working with the previously described lithium compound, and using multiples of the trisiloxane, one can form a lithium-containing polymer, which in addition to having in the polymer diorganosiloxy units derived from the lithium compound, it would also have multiples of the three siloxy groups from the cyclic trisiloxane, the multiples depending on the molar ratio of the trisiloxane to the lithium compound. Other blocks can then be added on to the polymer of Formula V. For instance, the latter composition in the aprotic solvent can be further reacted under the same conditions as previously, with hexaphenylcyclotrisiloxane to give a lithium compound of the formula VI 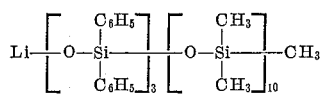

Obviously this interaction with various trisiloxanes can be continued indefinitely, each time introducing a different segment, if so desired, in a predetermined position to give a preordained, tailored polymer in which essentially all the blocks are in the same sequence as the order in which the cyclic polysiloxane is added.

As a further illustration, one can react in an aprotic electron-donating solvent at low temperatures, for instance, lithium trimethylsilanolate with trimethyl triphenylcyclotrisiloxane to give a composition of the following structure:

VII 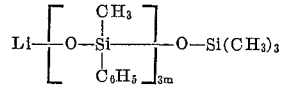

where $m$ is the number of moles of the cyclotrisiloxane per single mole of the lithium trimethylsilanolate.

In addition to the lithium compound being one in which there is a single lithium atom, one can also employ lithium compounds containing two or more lithium atoms attached to silicon through the medium of an oxygen atom. By the use of such dilithium or polylithium compounds, one is able to effect growth on both or several sides of the organosiloxy unit attached to the lithium atoms. For example, one class of dilithium compounds effective in the practice of the present invention can be represented generically by the formula:

VIII 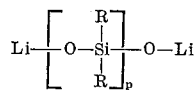

where R has the meanings given above and $p$ is a whole number equal to at least one, for instance, from 1 to 100 or more. Specific examples of such dilithium compounds are, for instance, lithium compositions of the following formulas:

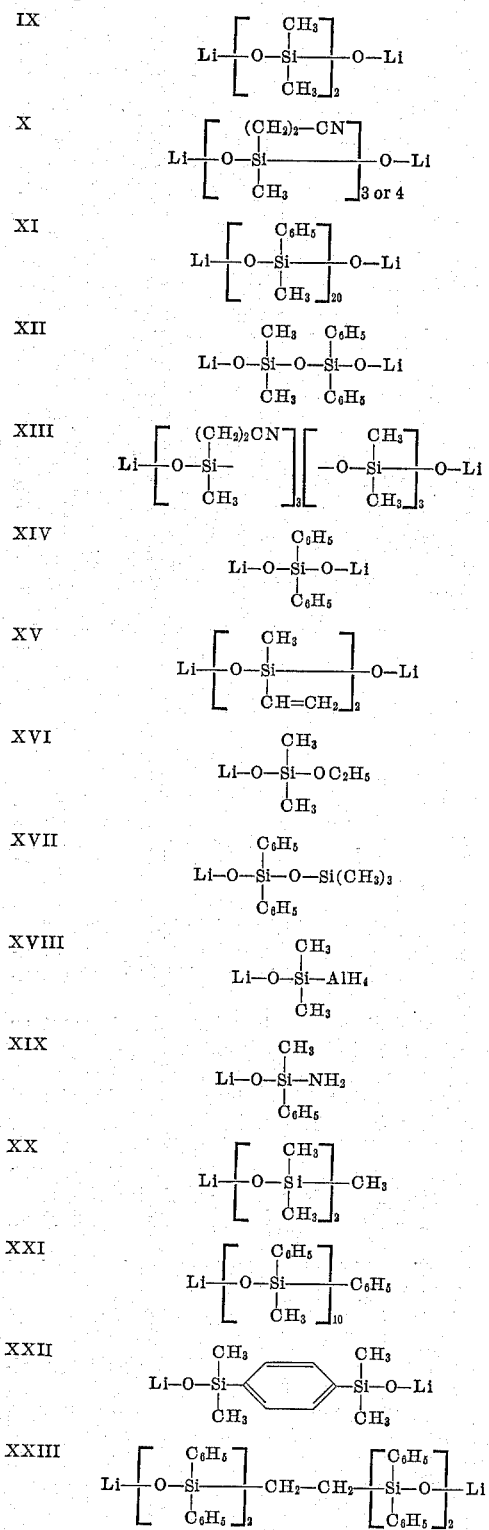

etc.

The lithium siloxanolates of, for example, Formulas IX to XV can then be reacted with cyclic trisiloxanes containing different silicon-bonded organic groups (e.g., hexaphenylcyclotrisiloxane, hexaethylcyclotrisiloxane, trimethyltriphenylcyclotrisiloxane, etc.) to give linear, ordered, block-block copolymers having siloxane units derived from both the lithium compound and the cyclotrisiloxane. For example, if one uses, according to my process, equal molar amounts of hexaphenylcyclotrisiloxane and the lithium siloxanolate of Formula IX, a composition of the formula XXIVa 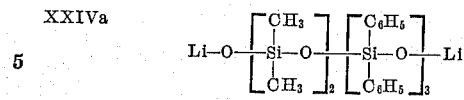

is obtained; with the dilithium siloxanolate of Formula XV, one obtains with hexaphenylcyclotrisiloxane a composition of formula XXIVb 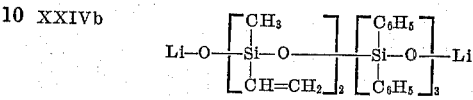

Additionally, if one were to react, for instance, the lithium salt of dimethylsilanediol [(CH$_3$)$_2$Si—(O—Li)$_2$] with hexamethylcyclotrisiloxane, one would obtain the composition XXV 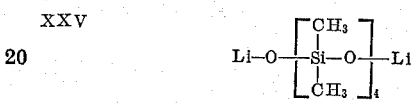

These difunctional lithium siloxanolates can then be further reacted, if desired with other cyclictrisiloxanes (or even with cyclic tetrasiloxanes under certain conditions) for the purpose of adding additional trisiloxane units (or even tetrasiloxane units), or multiples thereof to further lengthen the chain. It should be noted that once the initial reaction has taken place between the lithium compound and the cyclotrisiloxane, diorganocyclotetrasiloxanes can then be interacted more readily than if the latter is attempted first to be reacted with the lithium compound.

In addition to the organo-lithium compound being monofunctional or difunctional, that is, it contains 1 lithium atom or 2 lithium atoms, the organo-lithium compound can be polyfunctional and contain as many as 3 to 5 or more lithium atoms attached to silicon by means of an intermediate oxygen atom. Examples of such polyfunctional organo-lithium compounds capable of causing formation of block-block copolymers along 3 or more axes are, for instance, trilithium phenyl silanolate, trilithium methyl silanolate, tetralithium silanolate, as well as other polyfunctional organolithium compounds represented, for example, by the following formulas:

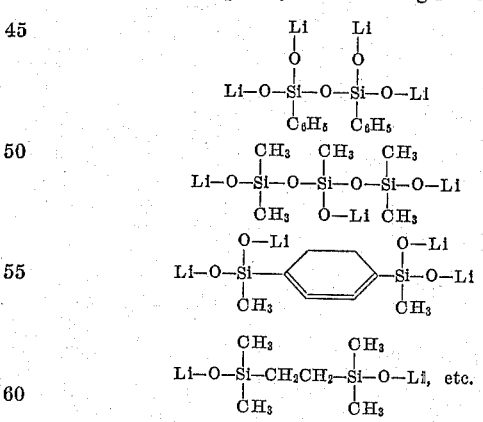

As the functionality of the organolithium compound increases above 2, that is, there are 3 or more lithium atoms in the organolithium compound, branching addition of the cyclic polysiloxanes will take place. It is of interest to note that if the same trifunctional metallo-organic compound using another alkali-metal, such as sodium, potassium, cesium, etc., is used in place of the above-mentioned trifunctional organolithium compound, gelation will take place and crosslinked polysiloxanes will be obtained.

Among the members which R and R' may be in the foregoing formulas are, for instance, alkyl radicals (e.g., methyl, ethyl, propyl, isobutyl, hexyl, etc.); aryl radicals (e.g., phenyl, naphthyl, biphenylyl, etc.); aralkyl radicals (e.g., benzyl, phenylethyl, etc.); alkaryl radicals (e.g., tolyl, xylyl, ethylphenyl, etc.); alkenyl radicals (e.g., vinyl, allyl, methallyl, etc.); halogenated aryl radicals (e.g., chlorophenyl, tetrachlorophenyl, chloronaphthyl, tetrafluorophenyl, etc.); cyanoalkyl radicals (e.g., cyanoethyl, cyanopropyl, cyanobutyl, etc.); etc. The presence of halogens, particularly, fluorine on the aliphatic carbon attached to silicon markedly increases the randomness of the formed polymers and should be avoided in the cyclic polysiloxane of Formula I.

Among the other lithium compounds which may be reacted with the cyclotrisiloxane of Formula I may be mentioned, for instance, lithium trimethylsilanolate, lithium triphenylsilanolate, dilithium dibenzyl silanolate, dilithium diethyl silanolate, trilithium phenyl silanolate, etc. The presence of halogen on an aliphatic carbon of the organolithium compound can be tolerated so that lithium compounds such as

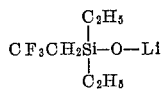

$(CF_3C_6H_4)_2Si$—$(O$—$Li)_2$ etc., can be employed in my invention.

Lithium silanolates (which term is intended to include lithium siloxanolates) can be produced by any one of many well-known methods. For example, one can mix at least 1 mole of lithium hydroxide and 1 mole of an organosilanolate of varied organic and hydroxy content, and by heating the mixture at about 50° C. for ½ to 16 hours, one produces the desired lithium compound. More specifically, lithium hydroxide or lithium metal can be reacted with, for instance, trimethylsilanol or triphenylsilanol to obtain, respectively, lithium trimethylsilanolate and lithium triphenylsilanolate. By the same process, one can react a diorganosilanediol with a stoichiometric amount of lithium alkyl under suitable conditions to obtain a dilithium diorganosilanolate. Additionally one can react a dihydroxy chain-terminated polydimethylsiloxane containing, for instance, from 2 to 20 dimethylsiloxy groups with lithium hydroxide under similar conditions to obtain a dilithium terminated polydimethylsiloxane containing lithium atoms in place of the hydrogen atoms and the same number of dimethylsiloxy groups as was in the dihydroxy terminated polydimethylsiloxnae (see Formulas IX to XIII as examples). The procedures can be applied to making organolithium compounds containing more than two reaction lithium atoms.

The hydroxy-containing organosilicon compound required for reaction with the lithium hydroxide can be produced by many known processes. Thus, in making monolithium or dilithium compounds, one method involves hydrolyzing with water a diorganodialkoxysilane or a triorganoalkoxysilane, and partially condensing it in a mixture of water and a solvent, for instance, diethyl ether. Alternatively, cyclic diorganosiloxanes can be reacted with steam at elevated temperatures and pressures to yield dihydroxy terminated polydiorganosiloxanes.

If desired, the lithium compound may contain as a terminal member, in addition to the lithium atom attached to silicon through the medium of an oxygen atom, any other grouping or atom represented by X in Formula II. Methods for preparing these latter compositions will be readily apparent to those skilled in the art. For example, a lithium compound, such as one having the formula

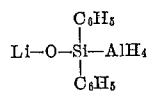

can be produced by effecting reaction between lithium aluminum hydride (LiAlH$_4$) and diphenyl silanediol.

Obviously, the number of cyclotrisiloxanes corresponding to Formula I which can be employed in the practice of the present invention can be varied widely. Among such cyclic trisiloxanes can be mentioned, for example, hexamethylcyclotrisiloxane, hexaphenylcyclotrisiloxane, cis- or trans-2,4,6-trimethyl - 2,4,6 - triphenylcyclotrisiloxane, various isomers of trimethyltriethylcyclotrisiloxane, various isomers of trimethyltrivinylcyclotrisiloxane, trimethyltris(beta-cyanoethyl)cyclotrisiloxane, trimethyltri-(4-chlorophenyl)cyclotrisiloxane,2,4-dimethyl-2,4,6,6 - tetraphenylcyclotrisiloxane, etc.

One unusual result which I have found in using lithium catalysts in aprotic solvents is the stereospecificity of siloxane ring opening induced by the basic lithium compounds. For instance, if cis-2,4,6-trimethyl-2,4,6-triphenylcyclotrisiloxane is reacted in tetrahydrofuran with a catalytic amount of n-butyl lithium at a temperature below 75° C., e.g., from 40 to 60° C., for about 2 to 16 hours, a non-flowing elastic gum is obtained which when isolated and analyzed by nuclear magnetic resonance techniques is found to contain 60-65% of the mers in an isotactic conformation and 35-40% of the mers in an heterotactic conformation. Small amounts of syndiotactic units may also be present, but their number is so small (and usually non-existent) that they do not interfere with the direction taken by the use of the lithium catalyst towards a majority formation of the isotactic conformation. When the same cis-cyclotrisiloxane is reacted under similar conditions with catalytic amounts of KOH, there is present in accordance with statistical distribution, about 25% isotactic conformation, 50% heterotactic conformation, and 25% syndiotactic conformation.

Among the preferred aprotic solvents which may be employed in the practice of this invention are non-acid oxygen-containing and nitrogen-containing organic solvents capable of coordinating with the lithium. These include, for instance, tetrahydrofuran (hereinafter referred to as "THF"), tetrahydropyrane, diethoxyethane, dimethyl ether of diethylene glycol, dimethyl acetamide, N-methylpyrollidone, isobutylene oxide, dimethyl sulfoxide, dioxane, diethyl ether of diethylene glycol, various tertiary amines such as, for instance, dimethyl aniline, tributyl amine, pyridine, etc. Solvents which contain active hydrogen or an acid hydrogen should be avoided because of the reactivity of the lithium with the acidic hydrogen to produce new reaction centers and thereby causing a randomness in the mixture and reducing blocking or order contrary to the intent of this invention.

The fact that such electro-donating solvents react so effectively with the lithium compound was totally unexpected and in no way could have been predicted since the prior art teaches that lithium ions are highly solvated by the above-described media and makes no reference or distinction between lithium and other alkali-metal atoms thus leading to the expectation, contrary to my discovery that lithium would react in a random fashion similar to that encountered when employing, e.g., sodium, potassium, etc. ions.

The manner in which my invention may be practiced may be varied widely. Initially it is necessary to have the active lithium ion in the form of the lithium compound as the initiating agent. These active lithium ions can be derived from previously prepared lithium organosilanolates (or organosiloxanolates) or they may be generated in situ by the reaction of organocyclosiloxanes and lithium derivatives (either organic or inorganic), for instance, butyl lithium, Li(OH), C(CH$_2$C$_6$H$_4$Li)$_4$, lithium aluminum hydride; lithium aluminum compounds of the generic formula LiAlR$_4$ where R has the meanings given above, lithium hydride, lithium metal, etc. The main concern in making the lithium compound in situ is that it be freed of any residual lithium derivative which will cause randomness such as would be the case when employing, for instance, lithium hydroxide in the in situ formation of the organolithium compound.

Thereafter, the organolithium compound is reacted with the organocyclotrisiloxane in the aprotic solvent employing temperatures advantageously initially below 75° C., for instance, from about −50° C. to 50° C. This initial reaction between the organolithium compound and the cyclotrisiloxane can take place for a time ranging from about 5 minutes to as long as 2 hours or more, depending upon such factors as the temperature employed, the lithium compound used, the molar concentration of the organolithium compound and the cyclotrisiloxane, etc. Thereafter, if it is desired to add on other organosiloxane units to the backbone of the siloxane units already prepared, one can incorporate in the reaction mixture (employing the same aprotic solvent) whatever other organocyclotrisiloxane (or even organo-cyclotetrasiloxane) is desired for the purpose and in the concentration intended to give the type of product sought. The conditions of addition and reaction are essentially the same as those for the initial reaction of the lithium compound and the cyclotrisiloxane, except that in succeeding reactions, higher temperatures of the order of from 100 to 175° C. are advantageously employed. In all circumstances, anhydrous conditions should be observed, and the exclusion of oxygen by means of inert atmospheres (e.g., nitrogen, helium, etc.) is a useful practice.

By means of this sequential addition of the various cyclotrisiloxanes, one can build polymers of any desired length predicting in advance the repetitive unit present in the polymer, its position in the polymer, and the length of the repetitive unit. The length of each segment may be predesigned and will be integrally multipled in accordance with the molar concentration of the cyclotrisiloxane reacted with the lithium compound or with successive block polymer reactions more particularly described above.

This ability to predesign the polymers and carry out the actual preparation of such polymers allows one to obtain products having unusual characteristics of solubility, heat resistance, crystallinity, improved toughness, temperature flexibility, low temperature flexibility, etc., quite apart from what might have been predicted from previously prepared copolymers. Thus, whereas previous random-type polymers are soluble in aromatic hydrocarbon solvents such as benzene or toluene, at room temperatures, the highly ordered polymers prepared in accordance with my process are relatively insoluble in these solvents and require solvents such as diphenyl ether or 2,4-chloroanisole at elevated temperature (e.g., 125 to 225° C.) for solubilization. This resistance to solvents is believed due to the crystallinity of the formed polymers. Polymers of this invention show a variation in crystalline melting points for the different organosiloxy segments.

The lithium block copolymer can be treated in various ways to obtain an organopolysiloxane free of lithium atoms or free of any other metals such as, for instance, aluminum hyride (see Formula XVIII). Thus, the final lithium polymer can be reacted with an acid, such as glacial acetic acid, to replace the lithium atom with a hydrogen atom to form a hydroxy-terminated polysiloxane. Alternatively, if one wishes to have a triorganosilane or similar terminating organosilicon group, one can react the lithium atom of the finally obtained lithium polymer with, for instance, a triorganohalosilane, such as trimethylchlorosilane, triphenylchlorosilane, etc., to obtain lithium chloride and a chain-terminating triorganosilyl group. This can lead to stable fluids having unusual characteristics, especially if highly isotactic structures in excess of 65% isotacticity is present as a result of being able to maintain the high degree of isotacticity from reaction of a lithium compound and a cis (or trans) trimer. The use of acids such as a glacial acetic acid would also remove the aluminum hydride ($AlH_4^-$) radical and the amino radical ($-NH_2$) to leave behind a silicon-bonded hydroxyl group. To insure complete removal of the glacial acetic acid, a wash with a 90–10%, by weight, mixture of methanol and water, will remove any residual glacial acetic acid which may be present in the polymer.

In order that those skilled in the art may better understand how the present invention may be practiced, the following examples are given by way of illustration and not by way of limitation. Unless otherwise stated all parts and percents are by weight. In each instance, unless otherwise indicated, the reactions were conducted under substantially anhydrous conditions and under an inert atmosphere, such as nitrogen. In the examples below, some of the lithium compounds were used as preformed compositions and some were made in situ and reacted with the desired cyclopolysiloxane.

PREPARATION OF LITHIUM COMPOUNDS

The dilithium siloxanolate of meso-1,3-dimethyl-1,3-diphenyldisiloxane-1,3-diol was prepared by reacting 2.9 grams (0.01 mole) of meso-1,3-dimethyl-1,3-diphenyldisiloxane-1,3-diol with 1 gram (0.0395 mole) fresh, dry lithium hydroxide pellets in 32 ml. anhydrous freshly distilled tetrahydrofuran for 18 hours at room temperature (about 27° C.). The reaction mixture was filtered, the lithium hydroxide residue was washed with tetrahydrofuran and the combined filtrates were stored under nitrogen in a clean, dry flask fitted with a rubber serum stopper. This yielded essentially quantitative amounts of the above-mentioned dilithium siloxanolate which will hereinafter be referred to as "DL–1."

Dilithium diphenyldisilanolate was prepared by dissolving 2.16 grams (0.01 mole) diphenylsilanediol in 20 ml. benzene and 7 ml. dry, freshly distilled tetrahydrofuran. This solution was added dropwise under nitrogen with rapid stirring to 0.024 mole n-butyl lithium in 15 ml. n-hexane and 5 ml. benzene at −35° C. The reaction mixture was warmed to room temperature, filtered and rinsed thoroughly with n-hexane to remove any excess of unreacted n-butyl lithium. The dilithium diphenyl silanolate was transferred to a reaction vessel in a nitrogen drybox and about 50 ml. dry benzene was added and the silanolate was dispersed by means of an ultrasonic mixer. Analysis of this material indicated close to a quantitative yield of the desired dilithium silanolate, which will hereinafter be referred to the "DL–2."

The dipotassium siloxanolate of meso-1,3-dimethyl-1,3-diphenyldisiloxane-1,3-diol was prepared similarly as the dilithium siloxanolate (DL–1) with the exception that 0.0395 mole of potassium hydroxide was used in place of the lithium hydroxide. The dipotassium siloxanolate thus obtained will hereinafter be referred to as "DL–3."

In the following examples, various block-block copolysiloxanes will be described and the polymers will be designated by letters, for example: AB, ABBA, ACBBCA, ABCCBA, etc., where

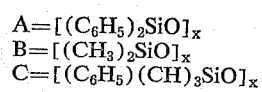

where $x$ is equal to at least three or multiples of three, depending on the molar concentrations of the cyclic polymers interacted with the lithium compound. It should be noted that in the succeeding examples, the letters used to designate the type of polymer obtained will not indicate the presence of the organosiloxy unit or units derived from the lithium compound for the reason that the amount of such organosiloxy units will usually be so small as to have little influence on the ultimate properties of the polymer. This of course does not mean that organolithium compounds of sufficient length in the organosiloxy portion thereof could not be used so as to exert an influence on the ultimate properties of the polymer.

It should, however, be recognized that the starting point for building the blocks of the block copolymers prepared in accordance with my invention will begin with the organosiloxy units of the lithium compound and, depending on whether the lithium compound is unidirectional or polydirectional orienting, this will determine whether the added block polymers will range in one or more than one direction beginning with the organosiloxy unit of the lithium compound. As an example, if one were to include the organosiloxy unit of the lithium compound, and the initial reaction in accordance with my process is between DL–1 and hexamethylcyclotrisiloxane, and thereafter reaction is effected with hexaphenylcyclotrisiloxane, the designation employing the letter system referred to above (before removing the lithium atoms) would result in a composition which could be referred to as follows:

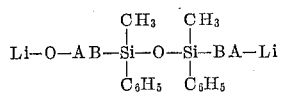

However, in the interest of simplification, as pointed out above, in referring to the obtained polymers by letters, the organosiloxy unit (or units) derived from the lithium compound will be omitted and the position of the lithium atom will be presumed as being substituted by, e.g., a hydroxy group, etc., depending on the mode of removing the lithium atom from the final polymer.

*Example 1*

This example shows the preparation of a poly-bis-(diphenylsiloxane - block - methylphenylsiloxane - block - dimethylsiloxane) (ACBBCA). More particularly, 5 grams (0.0225 mole) hexamethylcyclotrisiloxane was mixed with 2.2 ml. dry tetrahydrofuran and $0.071 \times 10^{-3}$ mole of DL–1. The mixture of ingredients was heated at reflux temperature for about 135 minutes. Thereafter, 5 grams (0.0162 mole) cis, trans-2,4,6-trimethyl-2,4,6-triphenylcyclotrisiloxane in 10 ml. benzene was added from a $CaH_2$ suspension to the reaction mixture. Reaction on a steam bath was continued for about 2 hours. Thereafter, 5 grams (0.0084 mole) hexaphenylcyclotrisiloxane dissolved in 30 ml. benzene was then added in the same manner and reaction continued for about 30 minutes. The solvent was then removed from the reaction mixture by passing nitrogen through the mildly heated system over a one hour period. The reaction mixture was then heated to 125° C. for 15 minutes followed by 4 hours at 200° C. to insure completion of the reaction. The product was then extracted from the reaction mixture with first glacial acetic acid and then with benzene to give an 86% yield of a tough, white hydroxy-terminated polymer whose siloxane blocks are represented as follows: ACBBCA.

*Example 2*

In this example, the same steps and method of preparation were employed as in Example 1 with the exception that DL–1 was first reacted with cis, trans-2,4,6-trimethyl-2,4,6-triphenylcyclotrisiloxane, then interacting hexamethylcyclotrisiloxane, and finally interacting hexaphenylcyclotrisiloxane to give a block copolymer (after removal of the lithium atoms and formation of the hydroxy terminated linear polysiloxane) represented by the letters ABCCBA.

*Example 3*

This example illustrates the synthesis of poly(diphenylsiloxane - block - dimethylsiloxane - block - diphenylsiloxane). More particularly, 9 grams (0.0405 mole) hexamethylcyclotrisiloxane was mixed with 3.8 ml. of dry tetrahydrofuran, and 0.000121 mole of DR–1 in a reaction vessel fitted with a reflux condenser. The reaction mixture was refluxed slowly for 2 hours to effect essentially complete interaction of the hexamethylcyclotrisiloxane. Thereafter, 6 grams (0.01 mole) hexaphenylcyclotrisiloxane dissolved in 30 ml. dry benzene was added to the reaction mixture and the latter refluxed for an aditional 30 minutes. The solvent was then slowly removed with a stream of nitrogen while raising the temperature. The reaction was then heated at 125° C. for 30 minutes and at 200° C. for 4 hours. The finished product, which was a tough, white elastomer, was then extracted with hot glacial acetic acid, washed acid-free with methanol and dried at 50° C. in vacuo. The polymer was obtained in a yield of about 99% and is represented by the letters ABBA. Whereas the methyl proton signal of this polymer was very sharp when measured with a Varian A–60 nuclear magnetic resonance spectrometer, random copolymers made by the usual techniques of coreacting, for instance, hexamethylcyclotrisiloxane with hexaphenylcyclotrisiloxane, were found to exhibit broad paramagnetic resonance signals for the methyl protons. Other diphenyl dimethyl block copolysiloxanes of the type ABBA were also prepared in the same manner as in Example 3 to determine the effect of molecular weight and segment lengths (molar concentrations). The following Table I shows the properties of such block copolymers:

TABLE I

| Composition, Mole Percent | | Design Segment Length | | | | $T_m$, ° C. | |
|---|---|---|---|---|---|---|---|
| | | $(CH_3)_2SiO$ | | $(C_6H_5)_2SiO$ | | | |
| $D_6$ | $P_6$ | $M_n \times 10^3$ | $DP_n \times 10^3$ | $M_n \times 10^3$ | $DP_n \times 10^3$ | $(C_6H_5)_2SiO$ | $(CH_3)_2SiO$ |
| 73 | 27 | 150 | 2 | 75 | 375 | 237 | −42 |
| 80 | 20 | 150 | 2 | 50 | 250 | 236 | −49 |
| 84.25 | 15.75 | 150 | 2 | 37.5 | 185 | 228 | −49 |
| 91.5 | 8.5 | 150 | 2 | 18.8 | 100 | 228 (210) | −47 |
| 96 | 4 | 150 | 2 | 8.5 | 42 | [1] Cooling | −46 |

[1] Cooling in differential scanning calorimetry.
NOTE.—$D_6$=hexamethylcyclotrisiloxane, $P_6$=hexaphenylcyclotrisiloxane, $M_n$=number number average molecular weight, $DP_n$=number average degree of polymerization (number of units represented by x in representation of polymers by unit letters), $T_m$=crystalline melting point.

The crystalline melting points described in Table I for these block copolymers account for the unusual solution behavior and strength which my block copolymers exhibit.

When DL–1 was reacted similarly as above, but first using octamethylcyclotetrasiloxane instead of hexamethylcyclotrisiloxane, no reaction took place even after heating the mixture at the reflux temperature of the mass for 48 hours and allowing the mixture to remain at room temperature for 25 days. This indicates the criticality of first reacting the lithium compound with a cyclotrisiloxane if block copolymers are to be realized.

*Example 4*

This example illustrates the building of polymer segment blocks in one direction, and specifically relates to the preparation of poly(methylphenylsiloxane-block-diphenylsiloxane). A prepolymer was prepared by reacting 5 grams trans-2,4,6-trimethyl-2,4,6 - triphenylcyclotrisiloxane with $10^{-4}$ mole n-butyl lithium in 5 ml. dry tetrahydrofuran for 16 hours at room temperature to yield a compound of the formula

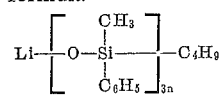

where $n$ is the number of moles of the above methyl phenyl cyclotrisiloxane.

To this reaction mixture was then added 3 grams (0.005 mole) hexaphenylcyclotrisiloxane. The reaction mixture was heated on a steam bath for one hour allowing during this time part of the tetrahydrofuran to escape. Subsequently the reaction mixture was heated at 125° C. for 15 minutes, at 150° C. for 15 minutes and finally at 200° C. for 30 minutes. The reaction mixture was extracted with glacial acetic acid and then treated with ethanol as in the previous examples. The product thus obtained was a white, rubbery solid substantially insoluble in benzene but soluble in hot (200° C.) diphenyl ether, and was crystalline according to X-ray scattering measurements (Deby-Scherrer techniques). This polymer could be pressed into a strong, flexible film at around 300° C. This polymer is represented by the letters AB.

Example 5

The following example illustrates the effect of carrying out a reaction similar to that of Example 3 with the exception that the corresponding potassium siloxanolate was used in place of the lithium siloxanolate. More particularly, 3 grams (0.0135 mole) hexamethylcyclotrisiloxane was reacted with $0.02 \times 10^{-3}$ mole DL–3 in 1.3 ml. dry tetrahydrofuran for one hour at reflux temperature to effect interaction of the ingredients. The reaction mixture was cooled to room temperature after which 2 grams (0.0036 mole) hexaphenylcyclotrisiloxane in 20 ml. benzene was added. The resulting reaction mixture was heated at a slow reflux for one hour and the solvent was removed by means of a nitrogen stream. The reaction mixture was then heated at 125° C. for 30 minutes, and finally at 200° C. for 2 hours. The polymer obtained was soluble in benzene. This polymer was dissolved in benzene containing a small amount of glacial acetic acid (to remove potassium atoms) and then was recovered by precipitation with methanol. This yielded 60 percent of a random copolymer which, in contrast to the flexible, strong polymer of Example 3, was slightly cloudy and stiff. When this gum was molded at elevated temperatures with an organic peroxide or benzene bis-sulfonazide, a weak film was obtained having a tensile strength of about 50 to 100 p.s.i. as contrasted to tensiles of 500–600 p.s.i. when the polymer of Example 3 was cross-linked.

The following example shows the effect of attempting to react a lithium compound with a mixture of cyclic organopolysiloxanes in contrast to the sequential addition described previously.

Example 6

In this example, 5.96 grams (0.0146 mole) of cis,trans-2,4,6-trimethyl-2,4,6-triphenylcyclotrisiloxane was melted and mixed with 26.02 grams (0.0438 mole) hexaphenylcyclotrisiloxane at 210° C. in a forced air oven. Thereafter, $2.4 \times 10^{-5}$ mole of lithium methyl diphenyl silanolate

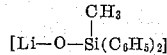

was added and mixed thoroughly with the reaction mass while heating the reaction mixture at 210° C. for 5 hours. Thereafter, the reaction product was cooled to give a hard, brittle, white, resinous solid, which when cross-linked at elevated temperatures with a benzene bis-sulfonazide had tensile strengths ranging from 100 to 150 p.s.i. A solution of the polymer in hot diphenyl ether was analyzed by nuclear magnetic resonance spectroscopy. The proton magnetic resonance spectra of the methyl protons indicated excessive multiples of signal and methyl environment and therefore a random structure.

Example 7

This example illustrates the non-equilibration characteristics of lithium ions when employed in the manner embraced by my invention. More particularly, 5 grams (0.0123 mole) cis,trans-2,4,6-trimethyl-2,4,6-triphenylcyclotrisiloxane was melted at 125° C. and mixed with $3.31 \times 10^{-6}$ mole DL–1. The reaction mixture was heated with stirring at 125° C. for 24 hours. At the end of this time, a portion of the polymer (identified as "Portion 1") was diluted with 10 ml. tetrahydrofuran and allowed to stand for 16 hours before addition of glacial acetic acid to remove the lithium atom and to substitute a silicon-bonded hydroxyl group. Another portion (identified as "Portion 2") was removed and polymerization immediately terminated by the addition of benzene containing glacial acetic acid. Each polymer was treated with methanol to remove stray traces of acetic acid, and then dried in vacuum at around 60° C. The total yield of polymers was approximately 99% of theoretical. The intrinsic viscosities of each of the portions in benzene at 25° C. were as follows:

Portion 1: $[\eta]=0.35$ dl./gm.
Portion 2: $[\eta]=0.38$ dl./gm.

These results indicated clearly the non-equilibration characteristics of the lithium ions under the conditions cited above. Under comparable conditions of sodium or potassium polymerizations, the effect of dilution is to shift the ring-chain equilibrium toward rings and thereby reduce the yield and molecular weight of the linear polymer.

Example 8

This example illustrates the effect of crosslinking some of these block copolymers to yield products which have unusual tensile strengths and elongations, even in the unfilled state. More particularly, 100 parts of the block copolymer (ABBA) of Example 3 was mixed on milling rolls maintained at temperatures of from 140 to 150° C. with 1%, by weight, thereof of benzene-meta-disulfonazide (BMDSA). The resulting mixture was molded into a sheet at 175° C. at 5,000 p.s.i. for 30 minutes. The molded sheet was removed from the mold and post-heated in an air-circulating oven at 175° C. for 2 hours. Additional crosslinking of this particular polymer was carried out similarly as above but instead using as the crosslinking agent 1%, by weight, of di-(α-cumyl) peroxide. The following Table II shows the properties of the crosslinked polymers in which the starting polymer was composed of approximately 80 mol percent dimethyl siloxy units and 20 mol percent diphenyl siloxy units. The tensile strengths and elongations of the cured polymers were tested at both room temperature (about 27° C.) and at 125° C. One sample (No. 2) had 20 parts fume silica per 100 parts polymer added as filler.

TABLE II

| Sample No. | Crosslinking Agent | Filler, parts | Tensile, p.s.i. | | Percent Elongation | |
|---|---|---|---|---|---|---|
| | | | Room Temp. | 125° C. | Room Temp. | 125° C. |
| 1 | Di(α-cumyl) peroxide | 0 | 420 | | 152 | 111 |
| 2 | do | 20 | 620 | 430 | 120 | 146 |
| 3 | BMDSA | 0 | 560 | 390 | 270 | 200 |

Example 9

In this example, a poly(diphenylsiloxane-block-dimethylsiloxane-block-diphenylsiloxane) polymer of the ABBA type was prepared similarly as in Example 3 with the exception that the blocks were in the molar concentration of 75 mol percent of the dimethylsiloxy units and 25 mol percent of the diphenylsiloxy units. Employing the BMDSA, a portion of this polymer was cured using the same cycle as in Example 8 and the sample tested for physical properties. In another instance, a sample of this ABBA polymer (before curing) was dissolved in hot diphenyl ether and thereafter precipitated with methanol to change the polymer from an elastomer to a resin. This resin was also compounded with BMDSA and cured similarly as in Example 8. In each instance, 1%, by weight, of the BMDSA was used as the curing agent, based on the weight of the polymer. The following Table III shows the results of tests conducted on each of the cured samples.

TABLE III

| Sample No. | Tensile, p.s.i. | | Percent Elongation | |
|---|---|---|---|---|
| | Room Temp. | 125° C. | Room Temp. | 125° C. |
| 4 | 575 | 402 | 275 | 302 |
| 5[1] | 1,109 | 540 | 209 | 247 |

[1] Precipitated from diphenyl ether with methanol.

Example 10

In this example, 4.08 grams (0.01 mole) cis,trans-2,4,6 - trimethyl-2,4,6-triphenylcyclotrisiloxane was dissolved in 25 ml. dry tetrahydrofuran in a reaction vessel under a nitrogen atmosphere. Thereafter, 6.2 ml. (0.01 mole) n-butyl lithium in a small amount of n-hexane was added with stirring to the siloxane solution. After stirring for about 2 hours, a lithium compound was obtained corresponding to the formula

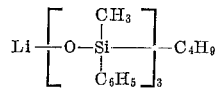

Thereafter, 0.1 ml. (0.029×10⁻³ mole) of this solution was added to 2.5 grams (0.011 mole) hexamethylcyclotrisiloxane dissolved in 2 ml. dry tetrahydrofuran. The reaction mixture was heated at its reflux temperature for about 2 hours to effect complete copolymerization of the hexamethylcyclotrisiloxane. Thereafter, 2.5 grams (0.0042 mole) hexaphenylcyclotrisiloxane in 10 ml. dry benzene was added and thoroughly mixed with the previously formed polymeric composition. The mixture was then heated at the reflux temperature of the mass while at the same time removing the tetrahydrofuran solvent under a nitrogen stream. After most of the solvent had been removed, the reaction mixture was heated further for 30 minutes at 125° C. and for 4 hours at 200° C. To remove the lithium atoms, the reaction product was mixed with sufficient glacial acetic acid to effect complete reaction with the lithium and the formed lithium acetate removed by filtration. The residual product was treated with ethanol to remove any traces of acetic acid. The product thus obtained was a tough, white crystalline elastomer in greater than 90% yield comprising a linear polydiorganosiloxane terminated at one end with a silicon-bonded hydroxyl group and at the other end with a silicon-bonded butyl group. This polymer was designated by the letters AB.

Example 11

About 10 grams (0.417 mole) lithium hydroxide was made into a slurry with 50 ml. benzene and heated so as to remove the benzene under a stream of nitrogen. Thereafter, 4.08 grams (0.01 mole) cis,trans-2,4,6-trimethyl-2,4,6-triphenylcyclotrisiloxane in 25 ml. dry tetrahydrofuran was added and the resulting slurry was stirred for about 18 hours at room temperature. The excess lithium hydroxide was removed by filtration and the filtrate was stored under nitrogen. The filtrate which was found to have 0.302×10⁻³ mole/ml. of basic lithium ion (by acid titration) corresponded to the formula

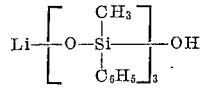

This was equivalent to one cyclopolysiloxane ring opening for each active lithium in the reaction product. About 0.08 ml. (0.025×10⁻³ mole) of the aforesaid lithium compound in the tetrahydrofuran was added to 2.5 grams (0.011 mole) hexamethylcyclotrisiloxane in 2 ml. dry tetrahydrofuran and heated at the reflux temperature of the mass for about 2 hours to effect copolymerization of the hexamethylcyclotrisiloxane. Thereafter, 2.5 grams (0.0042 mole) hexaphenylcyclotrisiloxane dissolved in 10 ml. benzene was added with stirring to the reaction product and while the reaction mixture was heated at its reflux temperature for about 30 minutes the solvent was removed under a nitrogen stream. The reaction mixture was then heated for 30 minutes at 125° C. and 4 hours at 250° C. after which the product was treated with glacial acetic acid and then with ethanol in the same manner as described in the preceding examples. This yielded a tough, white elastomer in excess of 90% of the theoretical yield. This product could be represented by the letters AB in which both ends of the polymer were hydroxy chainstopped.

Example 12

About 6 grams (0.1579) mole lithium aluminum hydride was formed into a slurry with 4.08 grams (0.010 mole) cis,trans - 2,4,6 - trimethyl-2,4,6-triphenylcyclotrisiloxane in 45 ml. dry tetrahydrofuran by mixing the ingredients at room temperature under nitrogen for about 18 hours. The resulting reaction mixture was filtered to yield a lithium compound corresponding to the formula

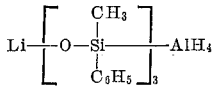

About 0.1 ml. (0.025×10⁻³ mole) of this lithium compound was added to 2.5 grams (0.01125 mole) hexamethylcyclotrisiloxane in 2 ml. dry tetrahydrofuran and the reaction mixture slowly heated at reflux for 2 hours to effect copolymerization. Thereafter 2.5 grams (0.0042 mole) hexaphenylcyclotrisiloxane in 15 ml. dry benzene was added, the reaction mixture further diluted with 20 ml. benzene and the mixture heated with stirring until complete solution was attained. The solvent was then removed with nitrogen and the reaction mixture was heated for 30 minutes at 125° C. and for 4 hours at 200° C. The product thus obtained was a tough, white elastomer which when treated with glacial acetic acid and subsequently with ethanol as in the preceding examples gave a polymer identified by letters AB in excess of 90% of the theoretical yield. This linear polysiloxane was terminated at each end by a silicon-bonded hydroxyl group.

Example 13

About 4.8 grams (0.6 mole) freshly ground lithium hydride was formed into a slurry under nitrogen with 4.08 grams (0.01 mole) cis,trans-2,4,6-trimethyl-2,4,6-triphenylcyclotrisiloxane in 30 ml. dry tetrahydrofuran. After mixing the ingredients for about 18 hours at room temperature, the slurry was diluted with 10 ml. dry benzene and filtered. The filtrate contained a lithium compound corresponding to the formula

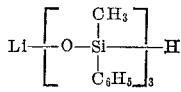

1 ml. of this lithium compound solution was added to 2.5 grams (0.01125 mole) hexamethylcyclotrisiloxane in 2 ml. dry tetrahydrofuran and heated at reflux temperature for about 5 hours in order to effect complete copolymerization. Thereafter, 2.5 grams (0.0042 mole) hexaphenylcyclotrisiloxane in 15 ml. benzene was added to the reaction mixture and the mixture was heated mildly under a nitrogen stream to remove the solvent. Thereafter, the remaining reaction product was heated at 125° C. for 30 minutes and for 4 hours at 200° C. The product was extracted with glacial acetic acid and thereafter treated with ethanol similarly as in the preceding examples to give a tough, white elastomer in a yield well in excess of 90% of the theoretical. This linear organopolysiloxane, which could be identified by the letters AB, was terminated at one end with a silicon-bonded hydroxy group and at the other end by a silicon-bonded hydrogen atom.

This example illustrates the important advantage of the sequential addition of cyclopolysiloxanes to a lithium compound as contrasted to the random type product obtained when the cyclopolysiloxanes are copolymerized at one time.

*Example 14*

A block copolymer represented by the letters ABBA was prepared by heating 5 grams (0.01225 mole) cis, trans - 2,4,6 - trimethyl - 2,4,6 - triphenylcyclotrisiloxane with 0.01 gram ($3.31 \times 10^{-5}$ mole) DL-1 for 16 hours at 125° C. After cooling the reaction mixture, 5 ml. tetrahydrofuran was added together with 5 grams (0.00843 mole) hexaphenylcyclotrisiloxane, and the reaction mixture was heated at its reflux temperature for about 1 hour. The tetrahydrofuran solvent was removed under a stream of nitrogen and the residue heated for 15 minutes at 125° C., for 15 minutes at 150° C., and for 15-20 minutes at 200° C. The product thus obtained was a white rubbery mass which was hard and tough at room temperature. The product was extracted and treated with glacial acetic acid and ethanol similarly as in the preceding examples to yield a product which was insoluble in benzene. The proton magnetic resonance spectra of the product indicated that no equilibration or rearrangement had occurred during the block copolymerization. X-ray scattering (Debye-Scherrer method) indicated that the product was highly crystalline.

As a comparison a copolymerization was conducted under randomizing conditions. More particularly, 5 grams (0.01225 mole) cis,trans-2,4,6-trimethyl-2,4,6-triphenylcyclotrisiloxane was dissolved and mixed with 5 grams (0.00843 mole) hexaphenylcyclotrisiloxane and 50 ml. dry benzene. The mixture was melted together at 210° C., flushed with nitrogen, and polymerization initiated with $3 \times 10^{-5}$ mole DL-1. The reaction was continued for about 5 hours at 210° C. to assure complete polymerization of the product. The product obtained was a stiff gum which was soluble in benzene and analyzed to be a random copolymer by nuclear magnetic resonance spectroscopy.

*Example 15*

This example illustrates the preparation of a block-block copolymer derived from a trifunctional organolithium compound. More particularly, trilithiumphenylsiloxanolate having the formula $$C_6H_5-Si-(O-Li)_3$$

was first prepared as follows. About 1.56 grams (0.01 mole) phenylsiloxanetriol was dispersed and partially dissolved in 20 ml. dry freshly distilled tetrahydrofuran and added under nitrogen to a stirred solution of n-butyllithium (0.0368 mole) in 20 ml. benzene and 23 ml. n-hexane between 0 to 25° C. The lithium salt which precipitated was collected on a filter in a nitrogen dry box and washed with several 5 to 10 ml. portions of benzene. The above-mentioned trilithium salt was stored under nitrogen at room temperature. This product was of greater than 95% purity and had the formula for the trilithium- phenyl trisiloxanolate. A mixture was formed of 5.15 grams (0.0222 mole) hexamethylcyclotrisiloxane and 0.0269 gram of the above prepared trilithiumphenyltrisiloxanolate ($1.54 \times 10^{-4}$ mole) in 2.4 ml. dry tetrahydrofuran, and the mixture was heated just below reflux for about 45 minutes. Thereafter, 5.15 grams (0.0087 mole) hexaphenylcyclotrisiloxane dissolved in 30 ml. dry benzene was added to the reaction mixture along with 10 ml. of benzene. The reaction mixture was stirred thoroughly and heated at the reflux temperature of the mass for about 1 hour. The solvent was removed under a stream of dry nitrogen and the reaction mixture was heated further at 125° C. for 30 minutes and subsequently at 200° C. for 4 hours. The product obtained was a hard, tough opaque polymer which was branched in three directions. This product could be illustrated by the following designation in which the designation includes the nucleus derived from the trilithiumphenyltrisilanolate.

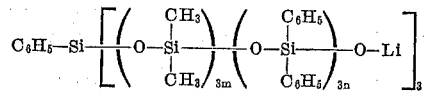

where $m$ and $n$ represent molar concentrations of the starting cyclopolysiloxanes. Without the nucleus, the polymer can be designated as

using the letter system referred to above.

*Example 16*

In this example, 9 grams hexamethylcyclotrisiloxane was mixed with 3.33 ml. dry tetrahydrofuran and 0.27 ml. of DL-2. The reaction mixture was heated at the reflux temperature of the mass for about 2 hours, and then the reaction product was interacted with 6 grams of hexaphenylcyclotrisiloxane dissolved in 30 ml. benzene employing the tetrahydrofuran initially used to make the first reaction product. The reaction mixture was then rinsed with 10 ml. benzene and the solvent was slowly removed from the mixture of ingredients by heating slightly under a nitrogen stream and then heating further at 125° C. for 20 minutes for 4 hours at 200° C. There was thus obtained, in excess of 90 percent of the theoretical yield, a tough block-block copolymer composed of units in accordance with the following designation

ABBA

The lithium polymer obtained when identified by the diorganosiloxy groups present therein, including that derived from the DL-2 corresponded to the formula

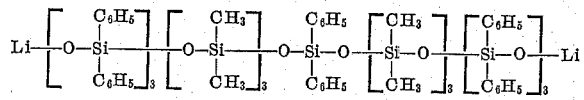

The polymers prepared in accordance with the practice of my invention have unique and unexpected properties. They can be readily differentiated from prior art compositions even from compositions which were obtained by methods intended to introduce block copolymers. In the first place polymers obtained by means of my process (whether with the lithium atoms or with the lithium atoms replaced) have at least 98% and closer to 100% preordained regularity of the block segments in the polymer as contrasted to the much lower pre-ordained block segments of a regular nature possible by means of the prior art methods for making block copolymers. In addition the products of my invention have unusual strengths and elongations, even in the unfilled state, when converted to the cured condition by means of crosslinking agents normally employed for the purpose such as benzyl peroxide, di-(α-cumyl)peroxide, tertiary butyl perbenzoate, etc. The crystallinity introduced by means of the regularity of the polymers herein prepared again imparts a unique characteristic which is not found to the best of my knowledge in polymers of comparable organosiloxane content in the prior art. In particularly the insolubility of my polymers even in the uncured state renders them unique in contrast to prior art polymers which exhibit ready solvation characteristics in usual solvents such as benzene, toluene, etc. This insolubility can be translated into improved resistance to swelling in hydrocarbon solvents when these polymers are converted to the infusible, insoluble state by peroxide curing or even by high energy radiation, for instance, high energy electrons.

The ability to obtain unequivocal synthesis of the block copolymers of organocyclosiloxanes results in the attainment of both crystalline and amorphous block segments in a polymer chain, the crystalline segments contributing to solvent resistant, high temperature stability, and tensile strength, while the amorphous segments allow low temperature flexibility or extensibility. These bulk properties can be changed by previous thermal or solvent treatment. This is shown by the hot solution treatment of the ABBA polymer and precipitation with, for instance, methanol. In the hot solution condition, the diphenylsiloxane blocks are extended and the dimethylsiloxane blocks are coiled or restrained due to the poor solvation. The net result is that when the polymer is precipitated from this state the diphenylsiloxane segments have a greater influence on the block properties. This results in an apparent change of the polymer from a rubbery polymer to a resinous product as is described above. This change is accompanied in the crosslinked state by an increase in tensile strength and a decrease in flexibility while the resistance to swelling by common aromatic solvents is materially increased.

The compositions of the present invention, particularly those in which the lithium atom has been removed and substituted with, for instance, hydrogen, triorganosilyl group, or some other organosilicon moiety, have many uses. They can be mixed with various fillers such as finely divided silica, carbon black, etc., and then crosslinked either by organic peroxides with which organopolysiloxane elastomers are usually cured, or with high energy radiation, as more particularly disclosed and claimed in U.S. Patent 2,763,609, issued Sept. 18, 1956, and assigned to the same assignee as the present invention. In the cured state, these polymers can be used for insulation purposes, for insulating electrical conductors, as encapsulating agents, in capacitors, and as coatings for surfaces which require resistance to moisture and to heat. By the proper choice of organosiloxane units in the polymers, it is possible to make fluids which can be employed as dielectric fluids, in lubricating media, etc. Alternatively the polymers, particularly those free of the lithium atom can be used for control of foam in liquids which normally are susceptible to foaming. Those organopolysiloxanes containing terminal silicon-bonded hydroxyl groups can be further condensed by dehydrating agents or by organometallic compounds, such as iron octoate, to give further lengthening of the chains through the medium of the silanol group. In this respect, the hydroxy chain-stopped polysiloxane can be used as an ingredient in making room temperature vulcanizing compositions as is more particularly disclosed in U.S. Patent 2,843,555, Berridge, assigned to the same assignee as the present invention.

What I claim as new and desire to secure by Letters Patent of the United States is:

1. The process for producing block-block organopolysiloxane copolymers, which comprises (A) forming an admixture of an aprotic solvent, an organolithium compound containing at least one lithium atom attached directly to a silicon atom through an oxygen atom, and a cyclic polysiloxane of the formula

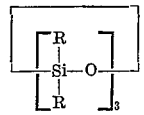

where R is a monovalent organic radical free of aliphatic substituted halogen and is selected from the class consisting of monovalent hydrocarbon radicals, cyanoalkyl radicals and halogenated aryl radicals, and maintaining said admixture under anhydrous conditions at a temperature at which said cyclic and said organolithium compound react and thereafter (B) adding to said reaction product a second cyclic polysiloxane having the formula

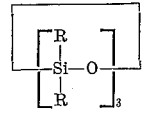

wherein R is as above-defined and which is different from the cyclic polysiloxane in (A) and maintaining the resultant mixture at a temperature at which said second polysiloxane reacts with said reaction product of (A) to produce a block-block organopolysiloxane copolymer.

2. The process as in claim 1, wherein the organolithium compound has the formula

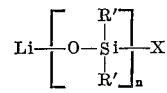

where R' is a monovalent organic radical, X is a member selected from the class consisting of R, OH, —OR', —OLi, —OSiR'$_3$, AlH$_4$ and NR''$_2$, where R has the meaning in claim 1, R'' is the same as R' and in addition may be hydrogen, and $n$ is a whole number equal to at least 1.

3. The process as in claim 1 in which the aprotic solvent is tetrahydrofuran.

4. The process as in claim 1 in which the organolithium compound is the dilithium siloxanolate of meso-1,3-dimethyl-1,3-diphenyldisiloxane-1,3-diol and the cyclic polysiloxane of (A) is hexamethylcyclotrisiloxane, and the cyclic polysiloxane of (B) is 2,4,6-trimethyl-2,4,6-triphenylcyclotrisiloxane.

5. The process as in claim 1 in which the organolithium compound is the dilithium siloxanolate of meso-1,3-dimethyl-1,3-diphenyldisiloxane-1,3-diol and the cyclic polysiloxane of (A) is hexamethylcyclotrisiloxane, and the cyclic polysiloxane of (B) is hexaphenylcyclotrisiloxane.

6. The process as in claim 1 in which the organolithium compound has the formula

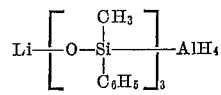

and the cyclic polysiloxane of (A) is hexamethylcyclotrisiloxane, the cyclic polysiloxane of (B) is hexaphenylcyclotrisiloxane.

7. The process as in claim 1 in which the organolithium compound has the formula

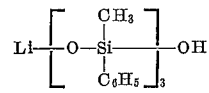

and the cyclic polysiloxane of (A) is cis, trans-2,4,6-trimethyl-2,4,6-triphenylcyclotrisiloxane, and wherein the cyclic polysiloxane of (B) is hexamethylcyclotrisiloxane.

8. The process as in claim 1 wherein a cyclic polysiloxane of the formula

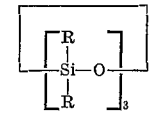

wherein R is as previously defined and which is different from the cyclic polysiloxane of (B) is added to the reaction product of (B) and the resulting mixture maintained at a temperature at which the cyclic polysiloxane and the reaction product of (B) react to produce a block-block organopolysiloxane.

9. The product obtained in accordance with the process of claim 1.

10. The process for making block-block-organopolysiloxane copolymers which comprises (A) forming an admixture of an aprotic solvent, an organolithium compound containing at least 1 lithium atom attached directly to a silicon atom through the medium of an oxygen atom and a cyclic polysiloxane of the formula

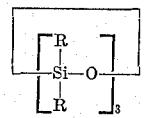

wherein R is a monovalent organic radical free of aliphatic-substituted halogen and is selected from the class consisting of monovalent hydrocarbon radicals, cyanoalkyl radicals and halogenated aryl radicals and maintaining said admixture under anhydrous conditions at a temperature at which said cyclic polysiloxane and said organolithium compound react and (B) adding to the reaction product of (A) a second cyclic polysiloxane having the formula

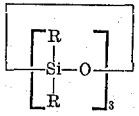

wherein R is as above-defined and which is different from the cyclic polysiloxane in (A) and maintaining the resultant mixture at a temperature at which said second cyclic polysiloxane and said reaction product of (A) react to produce a block-block organopolysiloxane copolymer and (C) substituting the lithium atom in the block-block organopolysiloxane with a chainstopping segment selected from the class consisting of hydrogen, organosilyl, and acyloxy groups.

11. The process as in claim 10 wherein the first cyclic polysiloxane is hexamethylcyclotrisiloxane and the second cyclic polysiloxane is trimethyl triphenylcyclotrisiloxane.

12. The product obtained in accordance with the process of claim 10.

References Cited

UNITED STATES PATENTS

| 2,634,284 | 4/1953 | Hyde | 260—448.2 |
| 2,860,152 | 11/1958 | Fletcher | 260—448.2 |
| 2,994,684 | 8/1961 | Johannson | 260—448.2 |
| 3,002,951 | 10/1961 | Johannson | 260—448.2 |
| 3,041,363 | 6/1962 | Merker et al | 260—448.2 |
| 3,132,167 | 5/1964 | Boot et al. | 260—448.2 |
| 3,146,251 | 8/1964 | Brown et al. | 260—448.2 |
| 3,156,668 | 11/1964 | Pike | 260—46.5 |
| 3,274,154 | 9/1966 | Kendrick et al. | 260—46.5 |

FOREIGN PATENTS

| 772,088 | 4/1957 | Great Britain. |
| 584,185 | 9/1959 | Canada. |

DONALD E. CZAJA, *Primary Examiner.*

LEON J. BERCOVITZ, *Examiner.*

M. I. MARQUIS, *Assistant Examiner.*